No. 635,934. Patented Oct. 31, 1899.
G. F. KEY
FILTER.
(Application filed Jan. 17, 1899.)
(No Model.) 2 Sheets—Sheet 1.
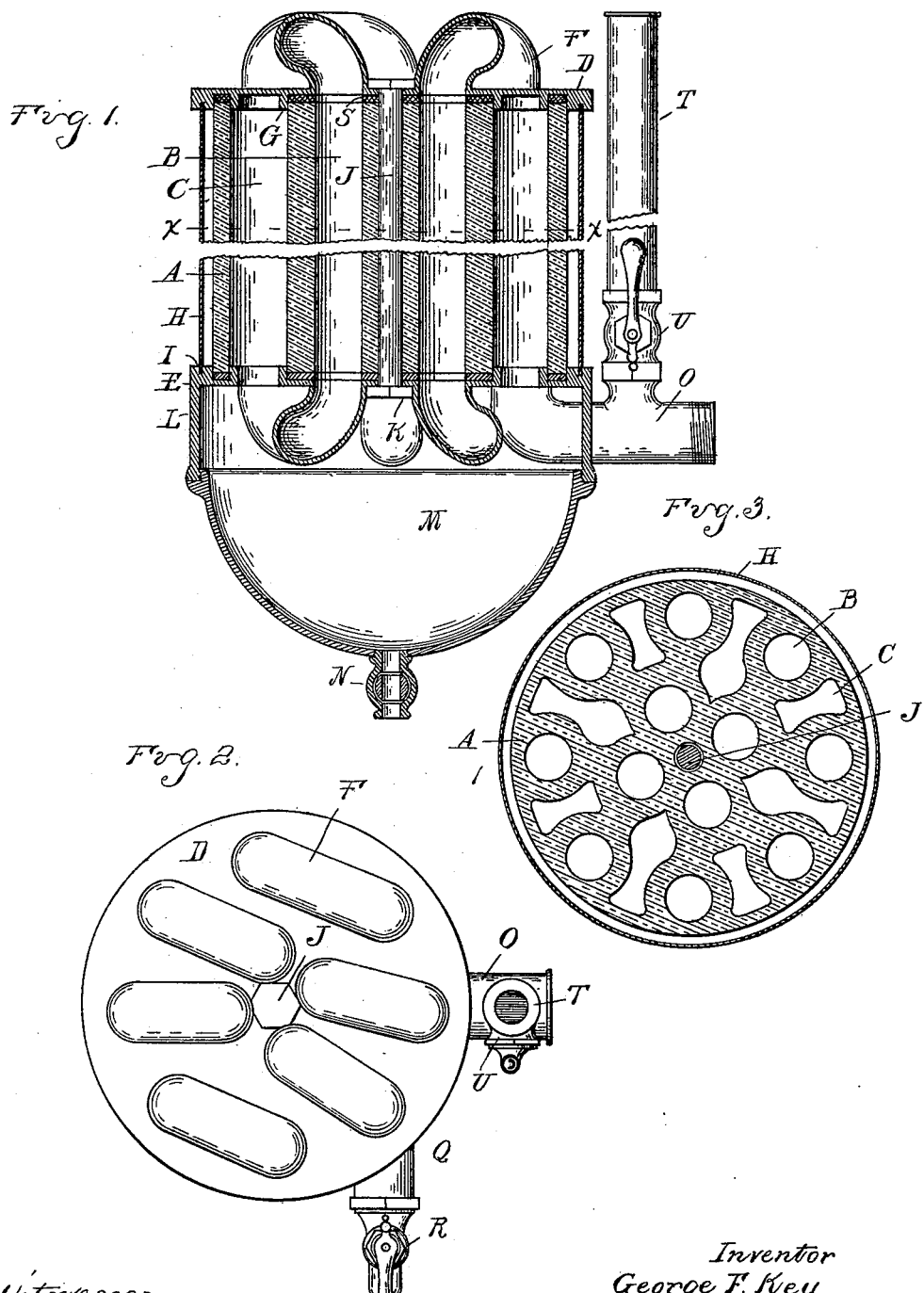
Witnesses
A. L. Hobby
H. C. Smith
Inventor
George F. Key
By [signature]
Attys.

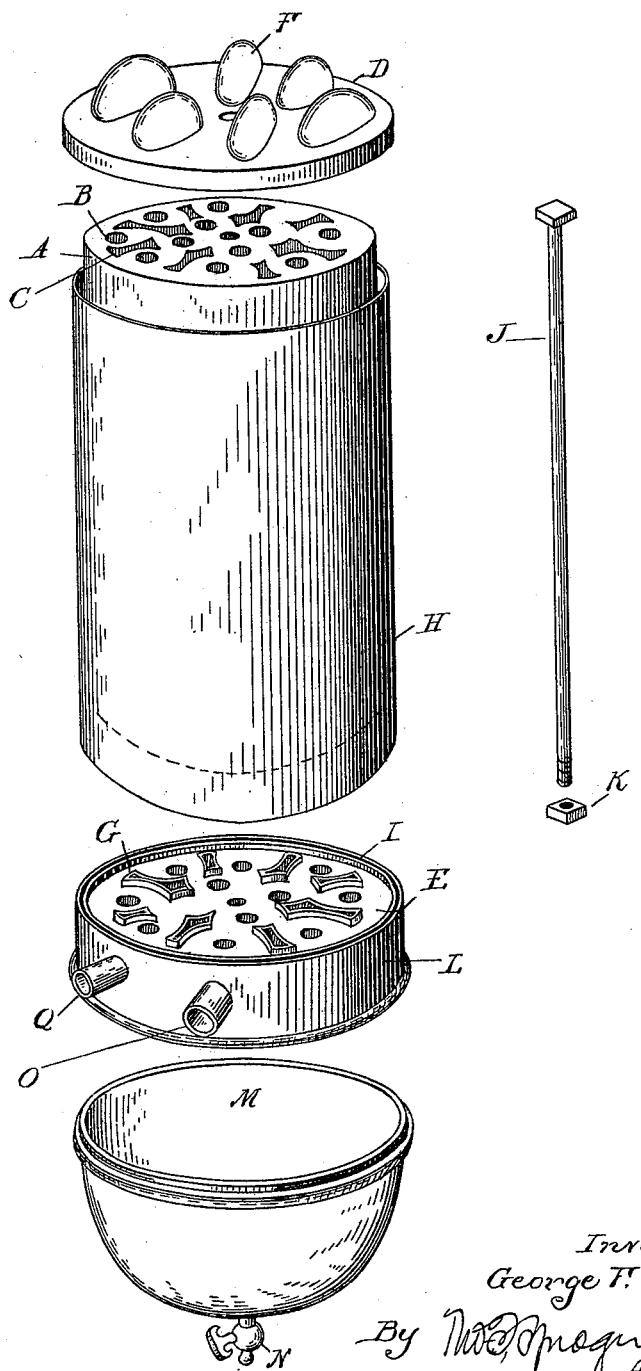

United States Patent Office.

GEORGE F. KEY, OF ANN ARBOR, MICHIGAN, ASSIGNOR OF ONE-HALF TO WILLIAM J. CLANCY, OF SAME PLACE.

FILTER.

SPECIFICATION forming part of Letters Patent No. 635,934, dated October 31, 1899.

Application filed January 17, 1899. Serial No. 702,397. (No model.)

*To all whom it may concern:*

Be it known that I, GEORGE F. KEY, a citizen of the United States, residing at Ann Arbor, in the county of Washtenaw and State of Michigan, have invented certain new and useful Improvements in Filters, of which the following is a specification, reference being had therein to the accompanying drawings.

The invention relates to filters, and has particular reference to a continuous-tube filter of such novel formation that while compact in construction it will comprise a large filtering-surface, permitting a copious supply of well-filtered fluid to be obtained.

In addition to the above it is a further object of my invention to provide a filter of simple and economic construction, which will permit of its being manufactured at a slight cost and which may be readily and thoroughly cleansed by the use of the unfiltered fluid without the necessity of disturbing the filter.

With the objects thus enumerated in view my invention consists, essentially, of a porous filtering-block having a multiple of bores therein so arranged and connected as to form a continuous bore or pipe provided with a number of bends, said block having cavities therein intermediate the bores adapted to receive and convey the filtered fluid, and a reservoir provided with a suitable outlet, into which the cavities discharge. By forming a continuous pipe or bore within the filtering-block and providing said pipe with a large number of bends or turns I am enabled to obtain a considerably greater amount of filtering-surface than has heretofore been acquired in devices of this kind. Also the filter may be quickly cleaned by allowing the unfiltered fluid to pass through the continuous bore uninterruptedly, thus effectually removing from the pipe all material collected or strained from the fluid.

The invention further consists in the novel construction, arrangement, and combination of the various parts of the filter, as will be more fully hereinafter described and shown in the drawings.

Figure 1 is a vertical central section through the filter. Fig. 2 is a top plan view thereof. Fig. 3 is a cross-section taken on line $x\ x$, Fig. 1; and Fig. 4 is a perspective view of the various parts of the filter detached.

The reference-letter A designates a porous block, preferably cylindrical in configuration, through which extend a multiple of bores B and a plurality of cavities C. The cavities are arranged intermediate the bores, as shown, and, as before set forth, are adapted to receive and convey the filtered fluid. In order that a continuous pipe may be formed, I provide an upper cap D and a lower cap E for the block, which caps carry, preferably integral therewith, the return-bends F, which are adapted to connect the bores in such manner as to produce a continuous pipe. Each cap is provided with flanges G, which are adapted when the parts are connected together to extend within the cavity C, thus holding the caps in their proper position relatively to the block.

H designates a casing which surrounds the block and which is adapted to be seated within a groove I, formed for that purpose in each cap, and the said caps are secured to the block and casing by means of a bolt J, which extends through apertures in the caps and block and is secured by means of a suitable nut K. The lower cap E is provided with an annular depending flange L, and to this flange is secured, by means of a threaded engagement, a reservoir M.

N designates a valve-controlled outlet for the reservoir.

The reference-letter O designates a supply-pipe which communicates with one end of the continuous bore, and Q designates a discharge-pipe communicating with the other end of said bore, the pipe O being adapted to be connected to a suitable source of supply and the pipe Q being provided with a stop-cock R, as shown in Fig. 2.

In order to make a tight fitting for the caps, I provide a packing S, Fig. 1, which I interpose between each cap and the block, as shown. Also in order to more thoroughly cleanse the continuous bore or pipe I arrange upon the supply-pipe O a tube T and provide said pipe with a valve U.

The parts being assembled in the manner set forth and shown and the stop-cock in the discharge end of the continuous pipe being closed, the fluid within the continuous pipe is filtered through the porous block into the cavities, where it is discharged into the reservoir M, from which it may be drawn off through the valve-controlled outlet N. When it is desired to cleanse the filter, the stop-cock in the discharge end of the pipe is opened, allowing an uninterrupted flow of the unfiltered fluid therethrough. To more effectually cleanse this pipe, the tube T may be filled with boiling water or other sterilizing fluid and the valve U opened to permit said fluid, together with the unfiltered fluid, to pass through the pipe.

What I claim as my invention is—

1. In a filter, the combination of a porous block having formed therein a continuous bore provided with a series of turns or bends through which the unfiltered fluid is adapted to uninterruptedly flow, and a plurality of cavities intermediate the bends extending through the lower end of the block, said cavities being adapted to receive and convey the unfiltered liquid, and a reservoir, having a valve-controlled outlet, independent of and below the block, into which the filtered fluid from the cavities is discharged.

2. In a filter, the combination of a porous block having formed therein a multiple of bores, and a plurality of cavities intermediate the bores adapted to receive and convey the filtered fluid, said bores and cavities extending entirely through said block, a multiple of return-bends arranged above and below the block connecting the bores to form a continuous pipe through which the unfiltered fluid may uninterruptedly flow, and a reservoir, having a valve-controlled outlet, independent of and arranged below the block into which the cavities discharge.

3. The combination of a porous block having formed therein and extending entirely therethrough a series of bores and a plurality of cavities arranged intermediate the bores adapted to receive and convey the filtered fluid, an upper and a lower cap for the block, each having return-bends thereon adapted to connect the bores to form a continuous pipe, means for securing the caps to the block and a reservoir provided with a valve-controlled outlet carried by the lower cap, substantially as described.

4. In a filter, the combination of a porous block having formed therein and extending entirely therethrough a series of bores, and a plurality of cavities arranged intermediate the bores adapted to receive and convey the filtered fluid, an upper and a lower cap for the block, each having return-bends thereon, adapted to connect the bores and form a continuous pipe, a packing interposed between each cap and the block, means for securing the caps to the block, and a reservoir provided with a valve-controlled outlet, carried by the lower cap, substantially as described.

5. In a filter, the combination of a porous block having formed therein and extending entirely therethrough a series of bores, and a plurality of cavities arranged intermediate the bores adapted to receive and convey the filtered fluid, an upper and a lower cap for the block, each having return-bends thereon, adapted to connect the bores to form a continuous pipe, through which the unfiltered fluid may uninterruptedly flow, a casing intermediate the caps and surrounding the block, a clamping-bolt extending through the block and caps, and a reservoir provided with a valve-controlled outlet, carried by one of the caps.

6. In a filter the combination of a porous block having formed therein a continuous bore provided with a series of bends or turns through which the unfiltered fluid may uninterruptedly pass, and a plurality of cavities intermediate the bends adapted to receive and convey the filtered fluid, a reservoir, having a valve-controlled outlet, into which the cavities discharge, a supply-pipe communicating with the continuous bore, and a valve-controlled tube T arranged upon and communicating with the supply-pipe substantially as described.

In testimony whereof I affix my signature in presence of two witnesses.

GEORGE F. KEY.

Witnesses:
JOHN L. DUFFY,
WM. J. CLANCY.